United States Patent
Mittal et al.

(10) Patent No.: US 10,210,403 B2
(45) Date of Patent: Feb. 19, 2019

(54) METHOD AND APPARATUS FOR PIXEL BASED LANE PREDICTION

(71) Applicant: HERE Global B.V., Eindhoven (NL)

(72) Inventors: Anish Mittal, Berkeley, CA (US); Richard Kwant, Oakland, CA (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/495,032

(22) Filed: Apr. 24, 2017

(65) Prior Publication Data

US 2018/0307917 A1    Oct. 25, 2018

(51) Int. Cl.
| | |
|---|---|
| G06K 9/00 | (2006.01) |
| G06K 9/62 | (2006.01) |
| G06K 9/03 | (2006.01) |
| G06K 9/38 | (2006.01) |
| G05D 1/02 | (2006.01) |

(52) U.S. Cl.
CPC ....... *G06K 9/00798* (2013.01); *G05D 1/0246* (2013.01); *G06K 9/036* (2013.01); *G06K 9/38* (2013.01); *G06K 9/6215* (2013.01)

(58) Field of Classification Search
CPC .......... G06K 9/00785; G06K 9/00791; G06K 9/00798; G06K 9/00805; G06K 9/00812; G06K 9/00818; G06K 9/00825; G06K 9/00832; G06K 9/00838; G06K 9/00845
See application file for complete search history.

(56) References Cited

U.S. PATENT DOCUMENTS

| | | |
|---|---|---|
| 8,351,704 B2 | 1/2013 | Kmiecik et al. |
| 9,483,700 B1 | 11/2016 | Chen et al. |

(Continued)

FOREIGN PATENT DOCUMENTS

DE    10 2008 050 456 A1    4/2010

OTHER PUBLICATIONS

Jannik Fritsch, Tobias Kuhnl, Andreas Geiger, "A New Performance Measure and Evaluation Benchmark for Road Detection Algorithms"; Proceedings of the 16th International IEEE Annual Conference on Intelligent Transportation Systems (ITSC 2013), The Hague, The Netherlands, Oct. 6-9, 2013 (Year: 2013), pp. 1693-1700.*

Brown, R. C., *IRIS: Intelligent Roadway Image Segmentation Using an Adaptive Region of Interest*, Thesis, Virginia Polytechnic Institute and State University, Jun. 16, 2014, 111 pages.

Chen, T-Y., *A Novel Lane Line Detection and Tracking System of Car Videos*, Thesis, College of Computer Science National Chiao Tung University, Jul. 2012, 64 pages.

(Continued)

*Primary Examiner* — Bobbak Safaipour
(74) *Attorney, Agent, or Firm* — Alston & Bird LLP

(57) ABSTRACT

A method, apparatus, and computer program product are disclosed to estimate the accuracy of feature prediction in an image. Methods may include: receiving a binary ground truth map of pixels and a prediction map of pixels where pixels corresponding to features of an environment are assigned a 1 or a 0, and pixels not corresponding to features of the environment are assigned the other of a 1 or a 0; determining at least one feature within each of the ground truth map and the prediction map based on pixels including the at least one feature; computing the overlap of pixels of the at least one feature from the ground truth map with the pixels of the at least one feature from the prediction map; matching the at least one feature from the ground truth map with the at least one feature from the prediction map in response to the overlap of pixels satisfying a predetermined value; and establishing a precision of the prediction map based on the overlap of pixels.

21 Claims, 11 Drawing Sheets

(56) References Cited

U.S. PATENT DOCUMENTS

| | | | |
|---|---|---|---|
| 9,884,623 B2* | 2/2018 | Fasola | B60W 30/12 |
| 2007/0198188 A1* | 8/2007 | Leineweber | B60W 30/143 |
| | | | 701/300 |
| 2010/0310129 A1* | 12/2010 | Hopfner | G06K 9/44 |
| | | | 382/104 |
| 2011/0276592 A1* | 11/2011 | Gautama | G01C 21/32 |
| | | | 707/769 |
| 2016/0167582 A1 | 6/2016 | Chen et al. | |
| 2016/0275667 A1 | 9/2016 | Modica et al. | |
| 2018/0089505 A1* | 3/2018 | El-Khamy | G06T 7/11 |
| 2018/0129906 A1* | 5/2018 | Habibian | G06K 9/4628 |
| 2018/0129919 A1* | 5/2018 | Tang | G06K 9/4628 |
| 2018/0149487 A1* | 5/2018 | Lee | G01C 21/005 |

OTHER PUBLICATIONS

Kumar, A. M. et al., *Review of Lane Detection and Tracking Algorithms in Advanced Driver Assistance System*, International Journal of Computer Science & Information Technology (IJCSIT), vol. 7, No. 4, (Aug. 2015) pp. 65-78.

\* cited by examiner

METHOD AND APPARATUS FOR PIXEL BASED LANE PREDICTION

TECHNOLOGICAL FIELD

Example embodiments of the present invention relate generally to determining the accuracy with which features within images are detected based on pixel analysis, and more particularly, to a method and apparatus for evaluating the precision and recall of feature prediction through image analysis and ground truth pixel map comparison.

BACKGROUND

Road geometry modelling is very useful for three dimensional (3D) map creation and 3D terrain identification along with feature and obstacle detection in environments, each of which may facilitate autonomous vehicle navigation along a prescribed path. Traditional methods for 3D modelling of road geometry and object or feature detection are resource intensive, often requiring significant amounts of human measurement and calculation. Such methods are thus time consuming and costly. Exacerbating this issue is the fact that many modern day applications (e.g., 3D mapping, terrain identification, or the like) require the analysis of large amounts of data, and therefore are not practical without quicker or less costly techniques.

Some current methods rely upon feature detection from image data to perform road terrain detection, but these methods have deficiencies. For instance, some systems designed for terrain and feature detection around a vehicle exist, but may be unreliable. Further, the reliability of feature detection may not be known such that erroneous feature detection or lack of feature detection may adversely impact autonomous or semi-autonomous driving. Over-estimating the accuracy of feature detection may cause safety concerns as object locations may be improperly interpreted as accurate when they are actually inaccurate, while under-estimating accuracy may lead to inefficiencies through overly cautious behaviors.

BRIEF SUMMARY

Accordingly, a method, apparatus, and computer program product are provided for analyzing the accuracy of detection and location of features that are recognized within an environment. In an example embodiment, a method, apparatus and computer program product are provided that establish the accuracy, including precision and recall, of features using pixel analysis from ground truth maps and prediction maps.

In a first example embodiment, an apparatus is provided including at least one processor and at least one memory including computer program code. The at least one memory and the computer program code may be configured to, with the at least one processor, cause the apparatus to: receive a binary ground truth map of pixels where pixels corresponding to features of an environment are assigned a 1 or a 0, and pixels not corresponding to features of the environment are assigned the other of a 1 or a 0; receive a binary prediction map of pixels where pixels corresponding to features of an environment are assigned a 1 or a 0, and pixels not corresponding to features of the environment are assigned the other of a 1 or a 0; determine at least one feature within the ground truth map of pixels based on pixels including the at least one feature; determine at least one feature within the prediction map of pixels based on pixels including the at least one feature; compute an overlap of pixels of the at least one feature from the ground truth map with the pixels of the at least one feature from the prediction map; match the at least one feature from the ground truth map with the at least one feature from the prediction map in response to the overlap of pixels satisfying a predetermined value; establish a precision of the prediction map based on the overlap of pixels between the at least one feature of the ground truth map and the at least one feature of the prediction map; establish a recall of the prediction map based on the overlap of pixels satisfying a predetermined value for the at least one feature; and provide the precision and recall of the prediction map for use with an advanced driver assistance system to facilitate guidance of an autonomous vehicle.

According to some embodiments, the apparatus may be further caused to generate a report including the precision of the prediction map related to each of the at least one features and a recall of the prediction map related to a number of the at least one features found in the ground truth map that were found in the prediction map. The at least one feature from the ground truth map may include a first ground truth lane line of a road. The at least one feature from the prediction map may include a first prediction lane line of the road. The precision of the prediction may with respect to the first ground truth lane line may include a measure of overlap of pixels of the first prediction lane line with the pixels of the first ground truth lane line. The recall of the prediction map with respect to the ground truth map may include a measure of a number of features found in the prediction map relative to a number of corresponding features found in the ground truth map.

According to some embodiments, the apparatus may optionally be caused to generate a similarity matrix between the ground truth map of pixels and the prediction map of pixels, where the similarity matrix may include the features found in the environment of the ground truth map and the prediction map. The predetermined value may be established in response to a determined accuracy required for safe driving in an area corresponding to the first ground truth map. The precision of the prediction map and the recall of the prediction map may be used by an autonomous vehicle to facilitate navigation of roadways in the environment.

Embodiments described herein provide a computer program product including at least one computer-readable storage medium having computer-executable program code portions stored therein. The computer-executable program code portions may include program code instructions that, when executed, cause an apparatus to: receive a binary ground truth map of pixels where pixels corresponding to features of an environment are assigned a 1 or a 0, and pixels not corresponding to features of the environment are assigned the other of a 1 or a 0; receive a binary prediction map of pixels where pixels corresponding to features of an environment are assigned a 1 or a 0, and pixels not corresponding to features of the environment are assigned the other of a 1 or a 0; determine at least one feature within the ground truth map of pixels based on pixels including the at least one feature; determine at least one feature within the prediction map of pixels based on pixels including the at least one feature; compute the overlap of pixels of the at least one feature from the ground truth map with the pixels of the at least one feature from the prediction map; match the at least one feature from the ground truth map with the at least one feature from the prediction map in response to the overlap of pixels satisfying a predetermined value; establish a precision of the prediction map based on the overlap of pixels; and establish a recall of the prediction map based on the overlap of pixels satisfying a predetermined value for the at least one feature.

According to some embodiments, the computer program product may optionally include program code instructions to generate a report including the precision of the prediction map related to each of the at least one features and a recall of the prediction map related to a number of the at least one features found in the ground truth map that were found in the prediction map. The at least one feature from the ground truth map may include a first ground truth lane line of a road. The at least one feature from the prediction map may include a first prediction lane line of the road. The precision of the prediction map with respect to the first ground truth lane line may include a measure of overlap of pixels of the first prediction lane line with the pixels of the first ground truth lane line. The recall of the prediction map with respect to the ground truth map may include a measure of a number of features found in the prediction map relative to a number of corresponding features found in the ground truth map.

The computer program product of some embodiments may optionally include program code instructions to generate a similarity matrix between the ground truth map of pixels and the prediction map of pixels, where the similarity matrix includes the features found in the environment of the ground truth map and the prediction map. The predetermined value may be established in response to a determined accuracy required for safe driving in an area corresponding to the first ground truth map. The precision of the prediction map and the recall of the prediction map may be used by an autonomous vehicle to facilitate navigation of roadways in the environment.

Embodiments described herein may include a method including: receiving a binary ground truth map of pixels where pixels corresponding to features of an environment are assigned a 1 or a 0, and pixels not corresponding to features of the environment are assigned the other of a 1 or a 0; receiving a binary prediction map of pixels where pixels corresponding to features of an environment are assigned a 1 or a 0, and pixels not corresponding to features of the environment are assigned the other of a 1 or a 0; determining at least one feature within the ground truth map of pixels based on pixels including the at least one feature; determining at least one feature within the prediction map of pixels based on pixels including the at least one feature; computing the overlap of pixels of the at least one feature from the ground truth map with the pixels of the at least one feature from the prediction map; matching the at least one feature from the ground truth map with the at least one feature from the prediction map in response to the overlap of pixels satisfying a predetermined value; establishing a precision of the prediction map based on the overlap of pixels; establishing a recall of the prediction map based on the overlap of pixels satisfying a predetermined value for the at least one feature; and generating a report including the precision of the prediction map related to each of the at least one features and a recall of the prediction map related to a number of the at least one features found in the ground truth map that were found in the prediction map.

According to some embodiments, the at least one feature from the ground truth map may include a first ground truth lane line of a road and the at least one feature from the prediction map may include a first prediction lane line of the road. The precision of the prediction map with respect to the first ground truth lane line may include a measure of overlap of pixels of the first prediction lane line with the pixels of the first ground truth lane line. The recall of the prediction map with respect to the ground truth map may include a measure of a number of features found in the prediction map relative to a number of corresponding features found in the ground truth map.

According to some embodiments, the method may optionally include generating a similarity matrix between the ground truth map of pixels and the prediction map of pixels, where the similarity matrix includes the features found in the environment of the ground truth map and the prediction map. The predetermined value may be established in response to a determined accuracy required for safe driving in an area corresponding to the first ground truth map. The precision of the prediction map and the recall of the prediction map may be used by an autonomous vehicle to facilitate navigation of roadways in the environment.

Embodiments described herein may include an apparatus including: means for receiving a binary ground truth map of pixels where pixels corresponding to features of an environment are assigned a 1 or a 0, and pixels not corresponding to features of the environment are assigned the other of a 1 or a 0; means for receiving a binary prediction map of pixels where pixels corresponding to features of an environment are assigned a 1 or a 0, and pixels not corresponding to features of the environment are assigned the other of a 1 or a 0; means for determining at least one feature within the ground truth map of pixels based on pixels including the at least one feature; means for determining at least one feature within the prediction map of pixels based on pixels including the at least one feature; computing the overlap of pixels of the at least one feature from the ground truth map with the pixels of the at least one feature from the prediction map; means for matching the at least one feature from the ground truth map with the at least one feature from the prediction map in response to the overlap of pixels satisfying a predetermined value; means for establishing a precision of the prediction map based on the overlap of pixels; means for establishing a recall of the prediction map based on the overlap of pixels satisfying a predetermined value for the at least one feature; and means for generating a report including the precision of the prediction map related to each of the at least one features and a recall of the prediction map related to a number of the at least one features found in the ground truth map that were found in the prediction map.

According to some embodiments, the at least one feature from the ground truth map may include a first ground truth lane line of a road and the at least one feature from the prediction map may include a first prediction lane line of the road. The precision of the prediction map with respect to the first ground truth lane line may include a measure of overlap of pixels of the first prediction lane line with the pixels of the first ground truth lane line. The recall of the prediction map with respect to the ground truth map may include a measure of a number of features found in the prediction map relative to a number of corresponding features found in the ground truth map.

According to some embodiments, the method may optionally include means for generating a similarity matrix between the ground truth map of pixels and the prediction map of pixels, where the similarity matrix includes the features found in the environment of the ground truth map and the prediction map. The predetermined value may be established in response to a determined accuracy required for safe driving in an area corresponding to the first ground truth map. The precision of the prediction map and the recall of the prediction map may be used by an autonomous vehicle to facilitate navigation of roadways in the environment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
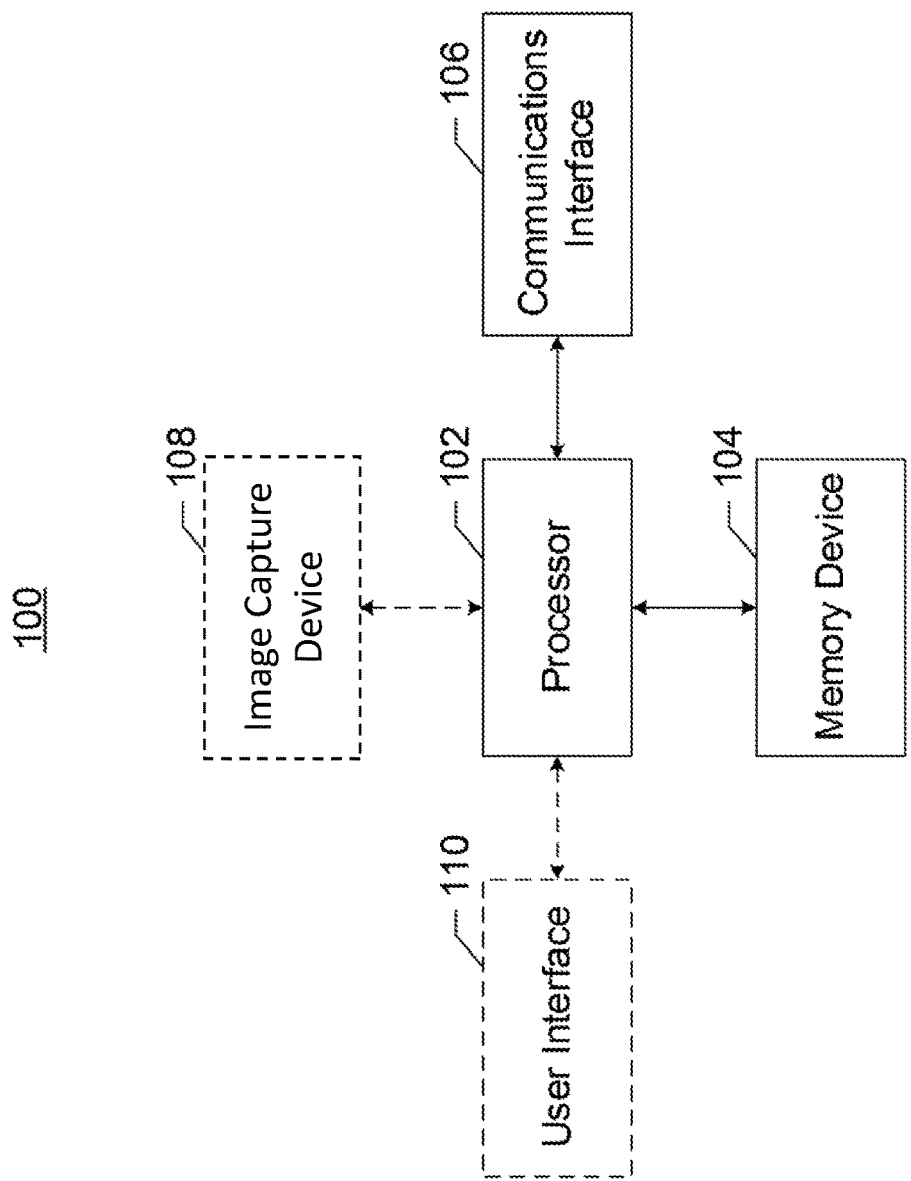
Figure 2:
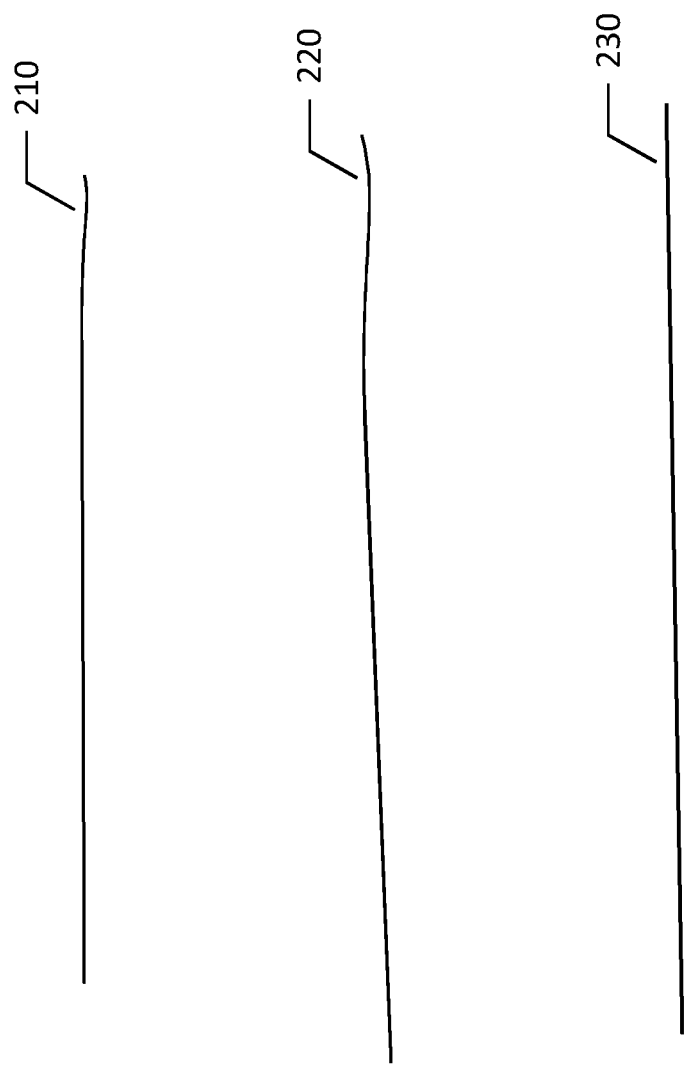
Figure 3:
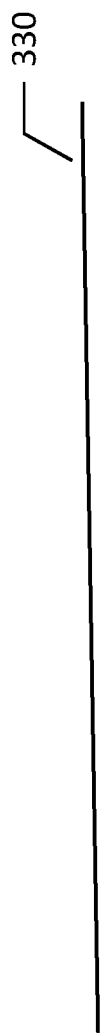
Figure 4:
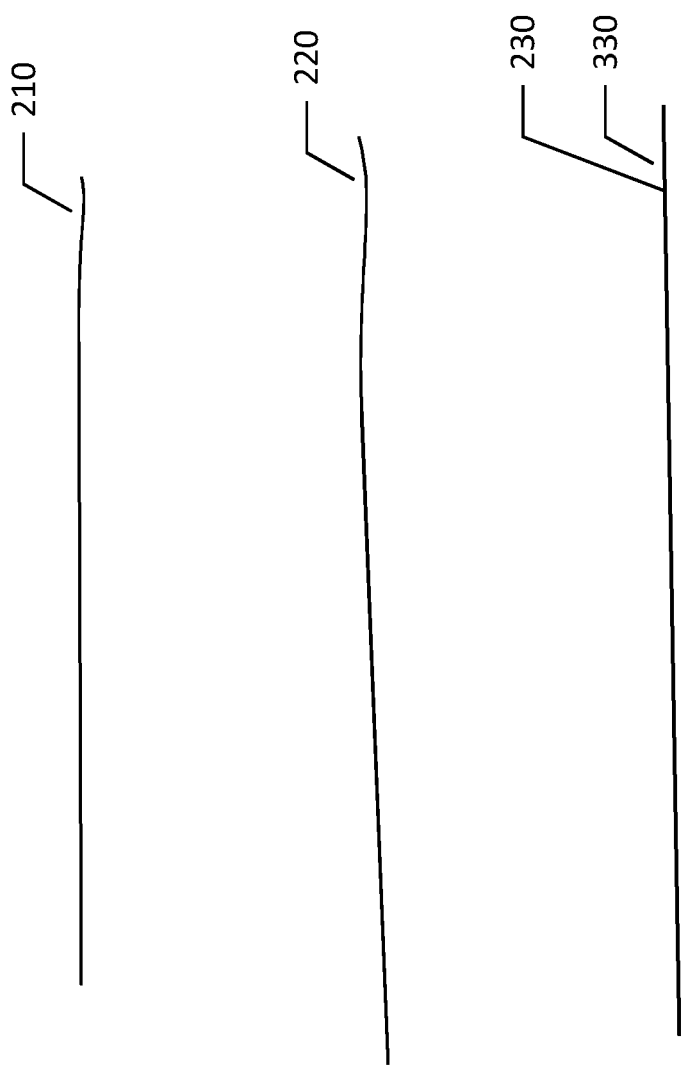
Figure 5:
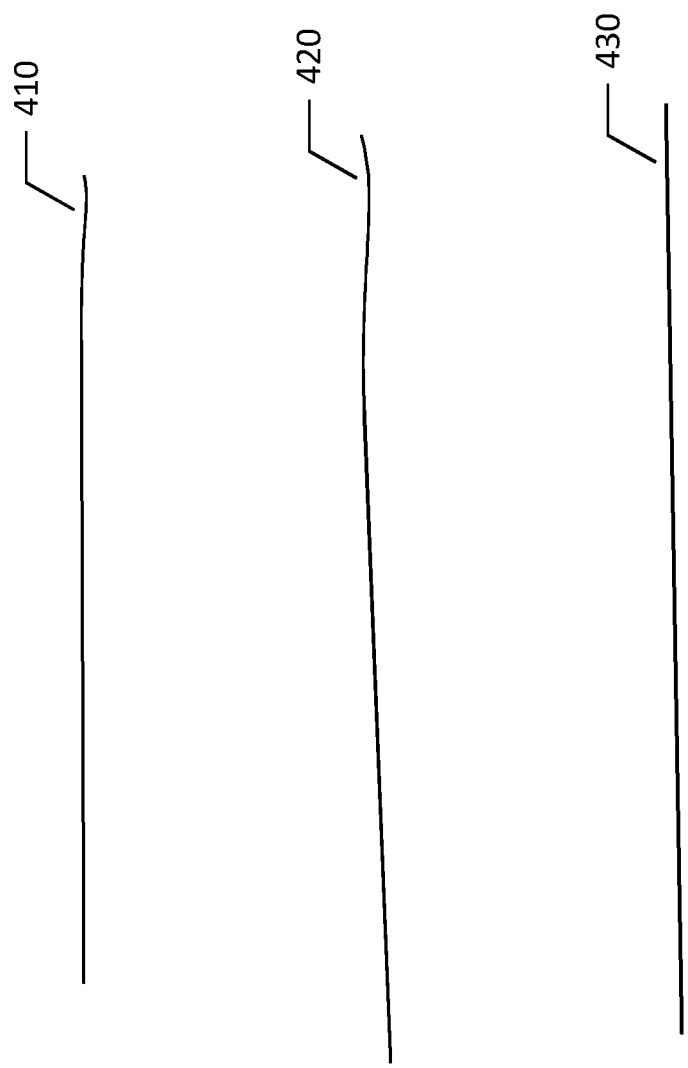
Figure 6:
Figure 7:
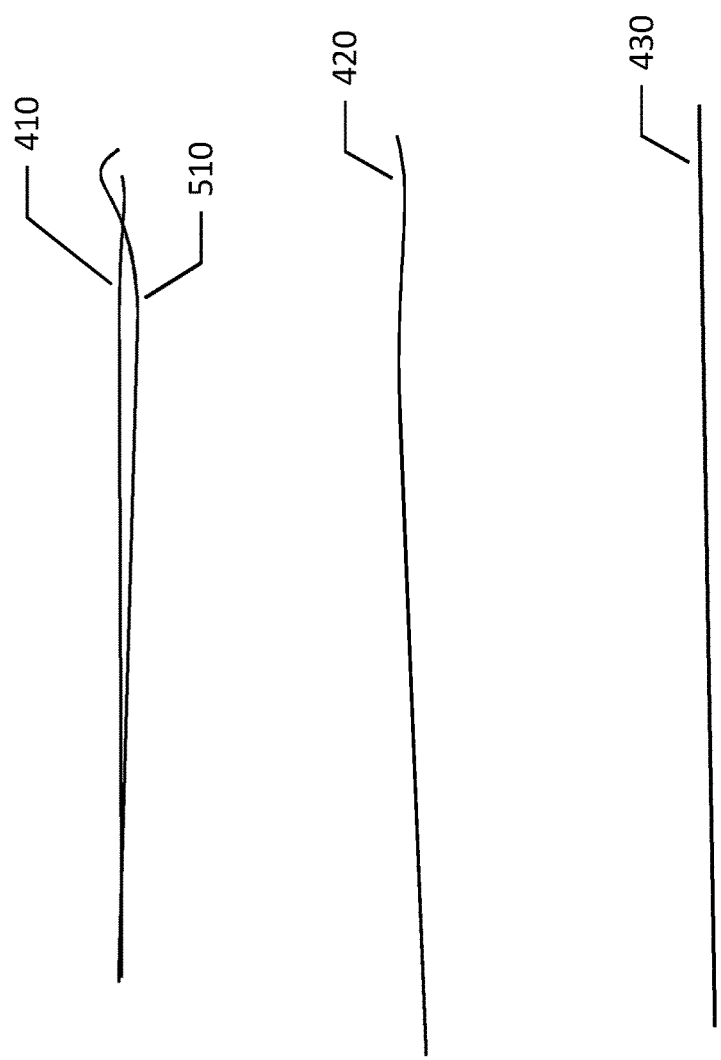
Figure 8:
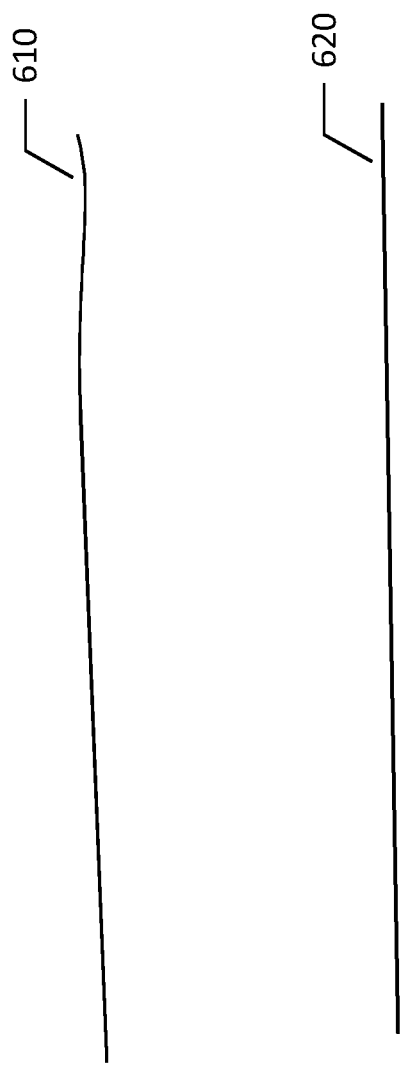
Figure 9:
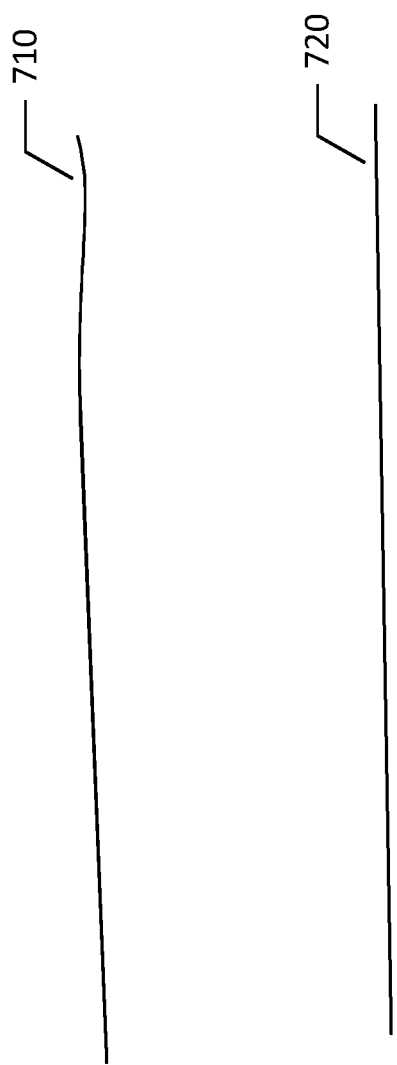
Figure 10:
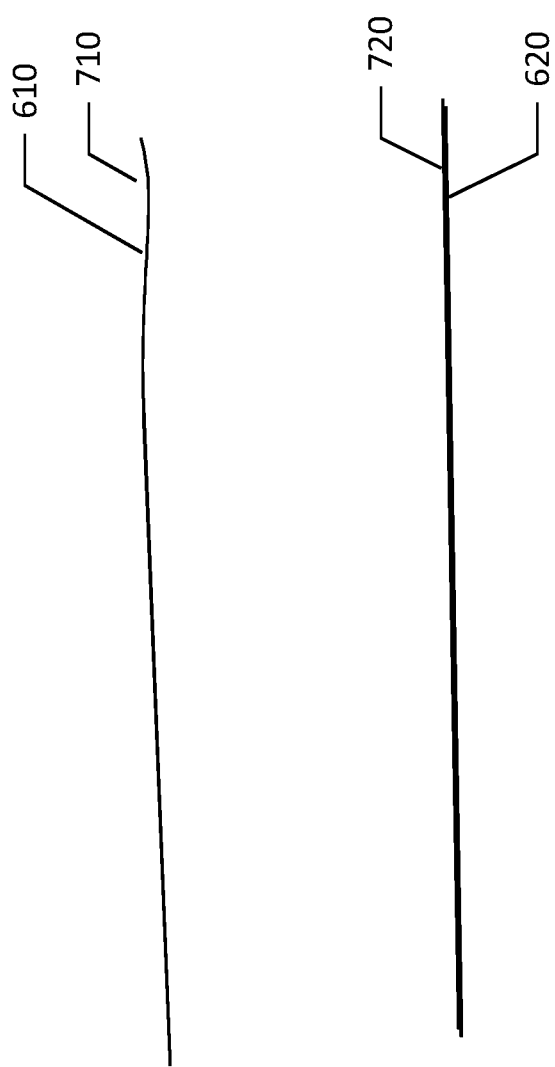
Figure 11:
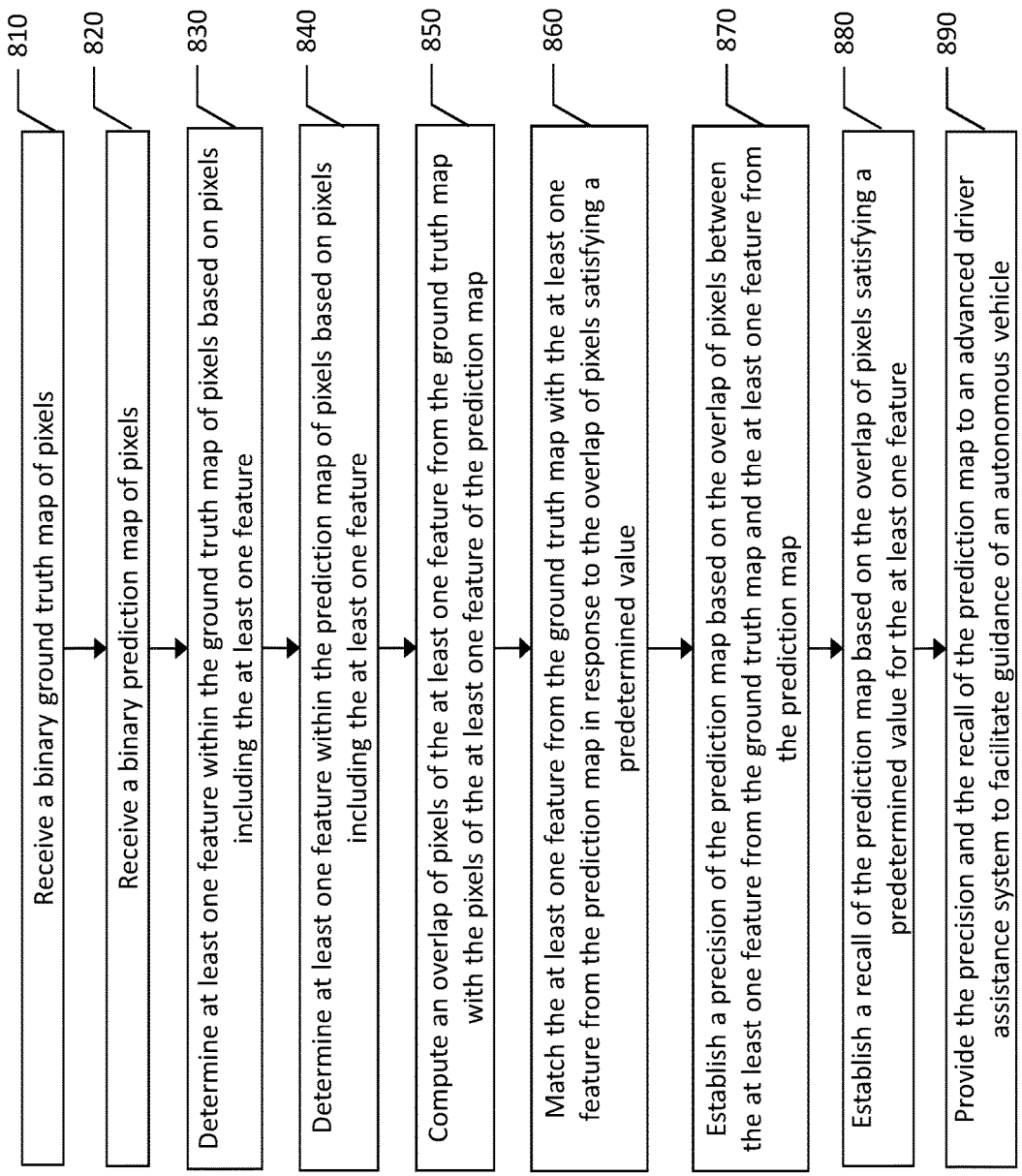

Having thus described certain example embodiments of the present disclosure in general terms, reference will now be made to the accompanying drawings, which are not necessarily drawn to scale, and wherein:

FIG. 1 shows a block diagram of an apparatus that may be specifically configured in accordance with an example embodiment of the present invention;

FIG. 2 is an example of a ground truth binary pixel map including features confirmed according to an example embodiment of the present invention;

FIG. 3 is an example of a prediction binary pixel map including features predicted according to an example embodiment of the present invention;

FIG. 4 is an example of the ground truth binary pixel map of FIG. 2 overlaid with the prediction binary pixel map of FIG. 3 according to an example embodiment of the present invention;

FIG. 5 is another example of a ground truth binary pixel map including features confirmed according to an example embodiment of the present invention;

FIG. 6 is another example of a prediction binary pixel map including features predicted according to an example embodiment of the present invention;

FIG. 7 is an example of the ground truth binary pixel map of FIG. 5 overlaid with the prediction binary pixel map of FIG. 6 according to an example embodiment of the present invention;

FIG. 8 is still another example of a ground truth binary pixel map including features confirmed according to an example embodiment of the present invention;

FIG. 9 is still another example of a prediction binary pixel map including features predicted according to an example embodiment of the present invention;

FIG. 10 is an example of the ground truth binary pixel map of FIG. 8 overlaid with the prediction binary pixel map of FIG. 9 according to an example embodiment of the present invention; and FIG. 11 is a flowchart of a method for establishing the accuracy feature prediction in imagery according to an example embodiment of the present invention.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

A method, apparatus, and computer program product are provided in accordance with an example embodiment of the present invention to compare predicted features of an image with features of a ground truth image to establish the accuracy of the predicted features. Methods disclosed herein use a full reference measurement method that compares spline/polyline representations of predicted and ground truth models. Understanding object location within an environment is of critical importance for applications such as autonomous driving. When objects and features are detected and their locations established through automated, predictive means, it is imperative to understand the precision of the predicted object and feature locations. It is also imperative to understand the recall with which the predictive means are able to detect each of the features in the environment. The precision and recall of a predictive means for feature detection establish the accuracy of the predictive means and the degree to which they may be relied upon by an autonomous vehicle control system. High precision and recall may enable an autonomous vehicle to function safely and efficiently in an autonomous manner an environment, while a low precision and/or recall may indicate that full autonomy of a vehicle in an environment may not be desirable or safe.

In order to establish the precision and recall, or collectively, accuracy of the prediction maps, embodiments may compute a matrix including the ground truth features and the predicted features, where each element of the matrix represents an overlap between a feature in the ground truth model and the corresponding feature in the prediction model. The overlap values can be compared against a threshold or criteria to determine if a ground truth feature corresponds to a candidate for a predicted feature. This comparison of the overlap can be used to establish the recall and precision of the prediction maps.

A binary ground truth image may be an image of an environment in which a value of 1 for a pixel indicates the presence of a feature at that pixel as established by human input or other similarly reliable input that can be trusted, while a value of 0 for a pixel indicates the lack of a feature at that pixel. Similarly, for a binary prediction image may use a value of 1 at a pixel for which a feature is detected, while a value of 0 is assigned to a pixel if no feature is detected. Embodiments may compute a matrix including the ground truth features and the predicted features, where each element of the matrix represents an overlap between a feature in the ground truth model and the corresponding feature in the prediction model. The overlap values can be compared against a threshold or criteria to determine if a ground truth feature corresponds to a candidate for a predicted feature. Associating a ground truth feature with a predicted feature according to a predefined degree of certainty enables lane level measurements to be conducted. The threshold or criteria through which a ground truth feature is associated with a prediction feature may be chosen, for example, based on a tolerance for the percentage of the lane that could be missed.

While example embodiments described herein can be used to establish the accuracy with which features have been located within a prediction image based on a ground truth image or model, certain embodiments may be implemented to establish the precision and recall of prediction models for establishing travel lanes of a roadway to facilitate autonomous driving, for example. Embodiments described herein may be performed by a variety of computing devices which may include any of a variety of mobile terminals, such as a portable digital assistant (PDA), mobile telephone, smartphone, laptop computer, tablet computer, desktop computer, server, or any combination of the aforementioned devices. Further, the method, apparatus, and computer program product of an example embodiment may include a networked device, such as a server or other network entity, configured to communicate with one or more devices, such as one or more client devices, such that computing devices may cooperate to perform methods described herein.

Regardless of the type of computing device, an apparatus 100 that is embodied by or associated with the computing device is illustrated in FIG. 1 that may be specifically configured to evaluate features in an image in accordance with an example embodiment of the present invention. It should be noted that while FIG. 1 illustrates one example configuration, numerous other configurations may also be used to implement embodiments of the present invention. As such, in some embodiments, although elements are shown as being in communication with each other, hereinafter such elements should be considered to be capable of being embodied within the same device or within separate devices.

Referring now to FIG. 1, the apparatus 100 may include or otherwise be in communication with a processor 102, a memory device 104, a communication interface 106, and optionally an image capture device 108 and a user interface 110. In some embodiments, the processor 102 (and/or co-processor or any other processing circuitry assisting or otherwise associated with the processor) may be in communication with the memory device 104 via a bus for passing information among components of the apparatus. The memory device 104 may be non-transitory and may include, for example, one or more volatile and/or non-volatile memories. In other words, for example, the memory device 104 may be an electronic storage device (e.g., a computer readable storage medium) comprising gates configured to store data (e.g., bits) that may be retrievable by a machine (e.g., a computing device like the processor). As defined herein, a "computer-readable storage medium," refers to a non-transitory physical storage medium (e.g., a volatile or non-volatile memory device) which is distinct from a "computer-readable transmission medium," which may take the form of an electromagnetic signal. The memory device 104 may be configured to store information, data, content, applications, instructions, or the like, for enabling the apparatus to carry out various functions in accordance with an example embodiment of the present invention. For example, the memory device 104 could be configured to buffer input data for processing by the processor 102 or to store image or model data, using which the apparatus 100 may identify image features such as travel lanes of a roadway. Additionally or alternatively, the memory device 104 could be configured to store instructions for execution by the processor 102.

The processor 102 may be embodied in a number of different ways. For example, the processor may be embodied as one or more of various hardware processing means such as a co-processor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading.

In an example embodiment, the processor 102 may be configured to execute instructions stored in the memory device 104 or otherwise accessible to the processor. Alternatively or additionally, the processor 102 may be configured to execute hard-coded functionality. As such, whether configured by hardware or software methods, or by a combination thereof, the processor 102 may represent an entity (e.g., physically embodied in circuitry) capable of performing operations according to an embodiment of the present invention while configured accordingly. Thus, for example, when the processor 102 is embodied as an ASIC, FPGA, or the like, the processor 102 may be specifically configured hardware for conducting the operations described herein. Alternatively, as another example, when the processor 102 is embodied as an executor of software instructions, the instructions may specifically configure the processor 102 to perform the algorithms and/or operations described herein when the instructions are executed. However, in some cases, the processor 102 may be a processor of a specific device (e.g., a pass-through display or a mobile terminal) configured to employ an embodiment of the present invention by further configuration of the processor by instructions for performing the algorithms and/or operations described herein. The processor 102 may include, among other things, a clock, an arithmetic logic unit (ALU), and logic gates configured to support operation of the processor 102.

Meanwhile, the communication interface 106 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

In some embodiments, the apparatus 100 may also include an image capture device 108, which may be any form of device capable of capturing a visual representation of an environment, such as an image of the environment ahead or in front of a vehicle traveling along a roadway. The image capture may optionally be a camera or sensor configured to capture light reflected off of objects in the environment. The image capture device 108 may optionally include, for example, a LIDAR (light detection and ranging) scanning device, which includes a laser emitter for transmitting laser pulses, and a sensor configured to detect the laser pulses as they return to the LIDAR scanning device to form a pixel map of the environment from the LIDAR data. The image capture device 108 or other element of the apparatus 100 may include one or more geo-referencing systems, such as the Global Positioning System (GPS), precision gyroscopes, or the like. Accordingly, images captured with the image capture device 108 may be associated with a location at which the image was captured, and may also be associated with a heading established based on dynamic analysis of the location or position of the apparatus 100.

Example embodiments described herein may use images having features identified therein, embodiments of an apparatus may include feature detection logic applied by the processor 102 to images from the image capture device 108 to establish the location of features and objects within a captured image. The processor 102 may thus generate a binary prediction image including pixels associated with features identified by a 1, while pixels absent features are identified by a 0. The opposite convention may optionally be used without deviating from the scope of the invention described herein. The image capture device 108 may include measurement hardware, such as LIDAR, to establish distances and measurements of features within the environment of the captured image. This measurement may be supplied to the feature detection software to enable processor 102 to more accurately detect and predict feature location in an environment.

While apparatus 100 may include an image capture device 108 in some embodiments, in other embodiments apparatus 100 does not include image capture device 108 and instead is configured to receive image data from another apparatus via communications device 106 or from a user via user interface 110. Accordingly, while some embodiments of the invention enable the capture and analysis of image data within apparatus 100, other embodiments may separate the operations involved in acquiring image data from the operations involved in analyzing the image data to establish features in the environment.

In some embodiments, the apparatus 100 may include a user interface 110 that may, in turn, be in communication with processor 102 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone, and/or the like. The processor and/or user interface circuitry comprising the processor may be configured to control one or more functions of one or more user interface elements through computer program instructions (e.g., software and/or firmware) stored on a memory accessible to the processor (e.g., memory device 104, and/or the like).

Using apparatus 100, embodiments of the present invention may establish features within a ground truth map and compute the overlap with features within a prediction map to establish a percentage of pixels that match between two corresponding features. The overlap between two features may be analyzed to establish a satisfactory match if they overlap by a certain percentage (e.g., a threshold) of pixels. The threshold percentage may vary in dependence upon the type of feature and the criticality with which a feature may need to be located to provide a useful prediction of the feature. Using the methods described herein, quality metrics regarding the prediction maps on a pixel level may be generated including a summary statistical analysis of predictive maps. These predictive maps may benefit various other technologies, such as autonomous driving, which requires accurate evaluation of a vehicle and its surroundings to safely navigate a roadway.

Autonomous driving has become a focus of recent technology with recent advances in machine learning, computer vision, and computing power able to conduct real-time mapping and sensing of a vehicle's environment. Such an understanding of the environment enables autonomous driving in two distinct ways. Primarily, real-time sensing of the environment may provide information about potential obstacles, the behavior of others on the roadway, and areas that are navigable by the vehicle. An understanding of where other cars are and what they may do is critical for a vehicle (or apparatus 100) to safely plan a route. Further, vehicles must be able to avoid both static and dynamic obstacles, which may change presence and position in real-time. Autonomous vehicles must also have a semantic understanding of what areas are around them that are navigable and safe for driving. Maps of areas may exist with very high levels of granularity to help facilitate this; however, exceptions will occur in which a vehicle may need to deviate from a roadway to avoid a collision or where a road's geometry or other map attributes (e.g., direction) have changed.

Another key to autonomous driving are vision techniques for localization with respect to a map of reference landmarks. This enables the understanding of a position and heading with respect to a roadway. On a coarse scale, navigation maps allow vehicles to know what roads to use to reach a particular destination. On a finer scale, maps allow vehicles to know what lanes to be in and when to make lane changes. This information is essential for planning an efficient and safe route as driving involves complex situations and maneuvers which need to be executed in a timely fashion, and often before they are visually obvious (e.g., a vehicle around a corner is stopped). Localization with respect to a map enables the incorporation of other real-time information into route planning. Such information can include traffic, areas with unsafe driving conditions (e.g., ice, weather, pot holes, etc.) and temporary road changes, like construction.

Autonomous vehicle navigation relies heavily on GPS which can provide a real-time location with a 95% confidence interval of 7.8 meters according to the standards set by governing agencies. However, in complex urban environments, reflection of GPS signals in "urban canyons" can increase the error such that location may be off by as much as 30 meters or more. Given that the width of many vehicle lanes is typically four meters or less, this accuracy is insufficient to properly localize an autonomous vehicle to enable safe route planning decisions. Other sensors, such as inertial measurement units (IMUs) can increase the accuracy of localization by taking into account vehicle movement, but these sensors may drift and fail to provide sufficient accuracy to ensure maximum safety.

Autonomous vehicle navigation requires localization accuracy, and accuracy to within 10 centimeters may provide sufficient accuracy for safety and effectiveness of autonomous navigation. One way to achieve this level of accuracy, as described herein, is through the use of visual odometry, in which features of the environment are detected from imagery. These features detected in the environment can then be matched to a database of features to establish a location. A feature may be any element that is distinguishable within an environment. For example, in the field of autonomous vehicle control, a feature may include a lane line, a road edge (curb, transition, soft shoulder, etc.), street signs, traffic signs, or other elements that contribute to or influence the autonomous driving algorithms.

Visual odometry can be used to determine various features within an environment, such as lane lines of a road to establish the lanes of the road and the boundaries thereof. Lane feature detection algorithms may be used in this regard; however, measurement of their performance may be necessary to ensure accuracy and repeatability. Described herein is a method of establishing the accuracy and repeatability of the detection and measurement of features in an environment. While the methods described herein could be used to establish the accuracy of locationing of a variety of features, example embodiments are described primarily with respect to establishment of travel lanes of a roadway. Embodiments described herein provide a method of measurement when pixel based lane features are available for prediction maps as well as ground truth maps. Ground truth, as described herein, is established as precise through the use of human input to label features of an image, such as lane lines of an image. Optionally, a non-human trusted source may be used to establish features in an environment depicted in an image. Features established through ground truth are used in the form of a ground truth map that depicts their positions within an environment. Prediction maps may be maps of an environment that use algorithms to predict the position of features in the environment. Prediction maps differ from ground truth maps in that prediction maps are the result of automation and algorithms performed according to machine learning or other machine intelligence processes, while ground truth maps are accurate and precise based on human input or other highly reliable and tested input.

Certain example embodiments described herein disclose a full reference measurement method that may compare the spline/polyline representations of predicted and ground truth features. Embodiments described herein disclose the generation of a matrix of a size based on a number of ground truth features (e.g., ground truth lanes) and a number of predicted features (e.g., predicted lanes). An element, (i, j) of the matrix may represent the overlap between the ground truth feature (i) and the prediction feature (j). The overlap values can be compared to a threshold to see if there is a corresponding ground truth feature for a predicted feature. Associating a ground truth feature with a predicted feature above a threshold level of confidence may enable feature-level measurements to be established. The threshold above which overlap concludes that a ground truth feature corresponds to a predicted feature may be chosen based on a tolerance for detection of a given feature or feature type. For example, a roadway lane in an environment as used for autonomous vehicle travel may require a high level of overlap due to the necessary safety of autonomous vehicle travel. A point of interest feature or a feature inconsequential to driving safety may have a much lower level of overlap necessary. For example, a street sign may require a lower degree of overlap than a vehicle travel lane to align a predicted feature with a ground truth feature.

In order to establish the accuracy of a prediction map, a ground truth map may be obtained. This ground truth map may be in binary form, where each pixel is labeled according to whether the pixel represents a feature (e.g., a lane line) or not. A pixel is assigned a value of 1 or a 0 if the pixel includes a detected feature, while a pixel is assigned a value of the other of a 1 or a 0 not used to represent a feature if the pixel does not include a detected feature. A prediction map may be obtained of pixels of the same environment as the ground truth map, where the prediction may also be in binary form using the same formula as above, where each pixel is assigned a value according to whether the prediction algorithm believes the pixel represents a feature. The images associated with the ground truth map and the prediction map may not be identical, but may be aligned according to image processing such that features may be substantially aligned.

For each of the ground truth map and the prediction map, features may be identified through, for example, image analysis. In the ground truth map, features may be positively identified by a human. In the prediction map, features may be recognized through image recognition algorithms. Features of the prediction map may be aligned or associated with features of the ground truth map. The ground truth map may then be overlaid virtually with the prediction map, or vice versa, whereupon a degree of overlap may be established between the pixels of a feature of the ground truth map and the corresponding feature of the prediction map.

According to an example embodiment, if an element of a similarity matrix between a ground truth feature and a predicted feature exceeds an overlap threshold, the two features are considered to match. The percentage of ground truth features or features of a specific type (e.g., travel lanes) that are matched to predicted features or predicted features of the specific type is a computed recall and a percentage of predicted features that are matched to ground truth features is a computed precision. The threshold for the calculated recall may be selected based on the tolerance for missing portions of a feature.

FIG. 2 is an example embodiment of ground truth features of a ground truth image or model. In the example embodiment, the features include vehicle travel lanes. As shown, three lanes are identified as ground truth lanes, 210, 220, and 230. FIG. 3 illustrates an example embodiment of the prediction map for the same area or environment represented in FIG. 2. As shown, only a single lane 330 is predicted. FIG. 4 illustrates the overlap, where prediction feature 330 overlaps ground truth feature 230 nearly identically. In this embodiment, one out of three ground truth lanes were successfully detected in the prediction map with no false positives. The precision of the one feature detected is about 100%. However, the recall of the features matched from the prediction map of FIG. 3 to the ground truth map of FIG. 2 is one out of three, such that the recall is 0.33.

FIG. 5 is another example of a set of features identified in a ground truth map, where the features are lanes 410, 420, and 430. FIG. 6 illustrates the corresponding prediction map, which only includes a single predicted feature 510. FIG. 7 illustrates the overlap between the ground truth map and the prediction map, where the predicted feature 510 overlaps the corresponding ground truth feature 410 to a low degree of about 30%, primarily on the left side of the illustrated feature. If an overlap threshold is set to 75%, or anything higher than the degree of overlap of ground truth feature 410 and predicted feature 510, the predicted feature 510 is not considered a match to ground truth feature 410. In the example embodiment of FIGS. 5-7, the precision would be zero since there is no match between the ground truth feature 410 and the predicted feature 510, and the recall would be calculated as zero since none of the ground truth features 410, 420, and 430, were properly predicted in the prediction map.

Using the aforementioned methods of using a full reference measurement to compare spline/polyline representations of features predicted map and features in a ground truth map, the methods of generating the predicted map features may be analyzed for accuracy. The metrics used to measure the accuracy may include the precision and recall. The precision may be established based on how closely the prediction map mapped each of the lane lines to a ground truth lane line. If the prediction map lane lines fall along the same lines as the ground truth lane lines, the precision is high as described in the examples above. Whereas if the prediction lane lines differ from the ground truth lane lines substantially, the precision may be low. A threshold may be established above which a feature is determined to be properly and accurately predicted relative to the ground truth, such as a similarity of 90% between the ground truth pixels and the prediction pixels for a given feature. Recall may include whether a lane line was found in the prediction map. If a ground truth map includes five lane lines to identify four lanes, and the prediction map only includes two lane lines, the recall is low at 40%.

Beyond establishing the existence and location of features, such as lane lines, a ground truth map, through the input of a human, may have identified therein various types of features or lane lines. The prediction map may use algorithms to establish a lane line type (e.g., yellow solid, white solid, yellow dashed, white dashed, etc.) and characterize each feature and each pixel thereof according to the established feature type. Features of the same type (e.g., the same line type) may be aligned in the image analysis such that embodiments described herein can identify the precision and accuracy of feature identification for position, but also for feature identification by type.

As described above, certain example embodiments of the present invention provide comprehensive analysis of the accuracy including the precision and recall of feature prediction based on image analysis and ground truth images. The precision may be calculated by finding the degree of overlap of a feature (e.g., the pixels with a value of 1) of the prediction map as compared to the corresponding feature of the ground truth map. For each feature, the percentage of overlapping pixels of that feature between the prediction map and the ground truth map may represent the precision with respect to that particular feature. A minimum threshold may be set above which a precision percentage is established as being a "hit" or a "match". If the precision is below the threshold percentage, the feature may be considered a "miss" or a "failure to match". The "precision" of a prediction map may be established as the percentage of "hits". If the prediction map lane lines fall along the same lines as the ground truth lane lines, the precision will be high.

The "threshold" percentage required to match a feature of the prediction map with a feature of the ground truth map on a pixel-by-pixel basis may be feature type dependent, such as a higher threshold for less critical feature types (e.g., features that do not influence autonomous vehicle function) and a lower threshold for critical feature types (e.g., features that govern autonomous vehicle navigation). A feature threshold may be established above which a feature is determined to be properly and accurately predicted relative to the ground truth, such as a similarity of 90% between the ground truth pixels and the prediction pixels for a given feature.

Recall of features may be calculated based on whether a feature of the ground truth map was found in the prediction map. For example, if a two features are found in a prediction map corresponding to two features of a ground truth map; however, their precision is below the threshold required for a match, the recall is established as zero since neither feature was a match. If one feature had a precision above the threshold, and the other feature had a precision below the threshold, the recall would be 0.5. If both features had precisions above the threshold, the recall would be 1.0. The recall may be established as the percentage of "hits" or "matches" from the ground truth map. Recall may provide an indication of whether a lane line was found in the prediction map. If a ground truth map includes five lane lines to identify four lanes, and the prediction map only includes two lane lines, the recall is low at 40%.

Beyond establishing the existence and location of features, such as lane lines, a ground truth map, through the input of a human, may have identified therein various types of features of lane lines. The prediction map may use algorithms to establish a lane line type (e.g., yellow solid, white solid, yellow dashed, white dashed, etc.) and characterize each feature and each pixel thereof according to the established feature type. Features of the same type (e.g., the same line type) may be aligned in the image analysis such that embodiments described herein can identify the precision and accuracy of feature identification for position, but also for feature identification by type. The precision and recall of various categories of features may be established to provide a better indication of the strengths of feature detection and prediction according to a certain predictive algorithm, for example.

Using the error map, various elements of the prediction map may be measured. For example, a lane width accuracy analysis could be performed to determine how accurately the prediction algorithms find the lane lines and the width of the lanes there between.

While the example embodiments describe the detection of vehicle travel lanes and analysis thereof, embodiments may similarly detect any features in an environment of a vehicle. For example, embodiments of the present invention can detect road structures, such as curbs, raised medians, vehicles (moving or parked), and classify them based on extracted features and rules. As a result, embodiments of the present invention provide an automated, low-cost, accurate, and fast method for determining the accuracy and recall of detecting features of an environment using image data. Embodiments described herein may provide a degree of confidence in the accuracy (e.g., precision and recall) of prediction models that describe an environment around a vehicle to provide the vehicle and the advanced driver assistance system with a more robust evaluation of location and features surrounding the location than existing methods. Physical measuring of every environment and establishing ground truth for visual odometry for every environment is complex and would require vast resources. Through predictive methods, features in environments may be established, and methods described herein may ensure that those predictive methods are accurate and robust to improve the safety of autonomous vehicle control in an environment.

FIG. 11 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 104 of an apparatus 100 employing an embodiment of the present invention and executed by a processor 102 of the apparatus 100. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 11 illustrates a method for establishing the accuracy feature prediction in imagery which may be used, for example, to establish vehicle travel lanes of a roadway based on an image captured by a vehicle to facilitate autonomous vehicle control. The illustrated method includes receiving a binary ground truth map of pixels including at least one feature at 210 and receiving a binary prediction map of pixels including at least one feature at 220. The prediction map may be generated, for example, by image processing and/or algorithms configured to establish features within an image. At least one feature may be determined in the ground truth map of pixels based on pixels including the at least one feature at 830. The feature may be determined and/or confirmed by a human providing instruction to confirm a feature identified in the ground truth map. At 840, at least one feature may be determined in the prediction map of pixels based on pixels including the at least one feature. The feature may be determined in the prediction map through image analysis algorithms to identify features. An overlap of pixels may be computed at 850 between the at least one feature of the ground truth map with a corresponding at least one feature of the prediction map. The at least one feature from the ground truth map may be matched with the corresponding at least one feature from the prediction map in response to the overlap of pixels satisfying a predetermined value at 860. At 870, a precision of the prediction may be established based on the overlap of pixels between the at least one feature from the ground truth map and the at least one feature from the prediction map. A recall of the prediction map may be established based on the overlap of pixels satisfying a predetermined value for the at least one feature at 880, and at 890, the precision and the recall of the prediction map may be provided to an advanced driver assistance system to facilitate guidance of an autonomous vehicle.

In an example embodiment, an apparatus for performing the method of FIG. 11 may comprise a processor (e.g., the processor 102) configured to perform some or each of the operations (810-890) described above. The processor may, for example, be configured to perform the operations (810-890) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 810-890 may comprise, for example, the processor 24 and/or a device or circuit for executing instructions or executing an algorithm for processing information as described above.

In some embodiments, certain ones of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the at least one processor, cause the apparatus to:
   receive a binary ground truth map of pixels where pixels corresponding to features of an environment are assigned a 1 or a 0, and pixels not corresponding to features of the environment are assigned the other of a 1 or a 0;
   receive a binary prediction map of pixels where pixels corresponding to features of an environment are assigned a 1 or a 0, and pixels not corresponding to features of the environment are assigned the other of a 1 or a 0;
   determine at least one feature within the binary ground truth map of pixels based on pixels including the at least one feature, wherein the at least one feature within the binary ground truth map of pixels comprises a feature type;
   determine at least one corresponding feature within the binary prediction map of pixels based on pixels including the at least one corresponding feature;
   compute an overlap of pixels of the at least one feature from the binary ground truth map with the pixels of the at least one corresponding feature from the binary prediction map;
   match the at least one feature from the binary ground truth map with the at least one corresponding feature from the binary prediction map in response to the overlap of pixels satisfying a predetermined value, wherein the predetermined value is determined based on the feature type;

establish a precision of the binary prediction map based on the overlap of pixels between the at least one feature of the binary ground truth map and the at least one corresponding feature of the binary prediction map;

establish a recall of the binary prediction map based on the overlap of pixels satisfying a predetermined recall value for the at least one feature; and provide the precision and the recall of the binary prediction map for use with an advanced driver assistance system to facilitate guidance of an autonomous vehicle.

2. The apparatus of claim 1, wherein the apparatus is further caused to:

generate a report including the precision of the binary prediction map related to each of the at least one features and a recall of the binary prediction map related to a number of the at least one features found in the binary ground truth map that were found in the binary prediction map.

3. The apparatus of claim 1, wherein the at least one feature from the binary ground truth map comprises a first ground truth lane line of a road;

wherein the at least one corresponding feature from the binary prediction map comprises a first prediction lane line of the road; and wherein the precision of the binary prediction map with respect to the first ground truth lane line comprises a measure of overlap of pixels of the first prediction lane line with the pixels of the first ground truth lane line.

4. The apparatus of claim 3, wherein the recall of the binary prediction map with respect to the binary ground truth map comprises a measure of a number of features found in the binary prediction map relative to a number of corresponding features found in the binary ground truth map.

5. The apparatus of claim 1, wherein the predetermined value is established in response to a determined accuracy required for safe driving in an area corresponding to the binary ground truth map.

6. The apparatus of claim 1, wherein the apparatus is further caused to:

generate a similarity matrix between the binary ground truth map of pixels and the binary prediction map of pixels, wherein the similarity matrix comprises the features found in the environment of the binary ground truth map and the binary prediction map.

7. The apparatus of claim 1, wherein the precision of the binary prediction map and the recall of the binary prediction map is used by an autonomous vehicle to facilitate navigation of roadways in the environment.

8. A computer program product comprising at least one computer-readable storage medium having computer-executable program code portions stored therein, the computer-executable program code portions comprising program code instructions that, when executed, cause an apparatus to:

receive a binary ground truth map of pixels where pixels corresponding to features of an environment are assigned a 1 or a 0, and pixels not corresponding to features of the environment are assigned the other of a 1 or a 0;

receive a binary prediction map of pixels where pixels corresponding to features of an environment are assigned a 1 or a 0, and pixels not corresponding to features of the environment are assigned the other of a 1 or a 0;

determine at least one feature within the binary ground truth map of pixels based on pixels including the at least one feature, wherein the feature within the binary ground truth map of pixels comprises a feature type;

determine at least one corresponding feature within the binary prediction map of pixels based on pixels including the at least one corresponding feature;

compute the overlap of pixels of the at least one feature from the binary ground truth map with the pixels of the at least one corresponding feature from the binary prediction map;

match the at least one feature from the binary ground truth map with the at least one corresponding feature from the binary prediction map in response to the overlap of pixels satisfying a predetermined value, wherein the predetermined value is determined based on the feature type;

establish a precision of the binary prediction map based on the overlap of pixels; and establish a recall of the binary prediction map based on the overlap of pixels satisfying a predetermined recall value for the at least one feature.

9. The computer program product of claim 8, further comprising program code instructions to:

generate a report including the precision of the binary prediction map related to each of the at least one features and a recall of the binary prediction map related to a number of the at least one features found in the binary ground truth map that were found in the binary prediction map.

10. The computer program product of claim 1, wherein the at least one feature from the binary ground truth map comprises a first ground truth lane line of a road;

wherein the at least one corresponding feature from the binary prediction map comprises a first prediction lane line of the road; and wherein the precision of the binary prediction map with respect to the first ground truth lane line comprises a measure of overlap of pixels of the first prediction lane line with the pixels of the first ground truth lane line.

11. The computer program product of claim 10, wherein the recall of the binary prediction map with respect to the binary ground truth map comprises a measure of a number of features found in the binary prediction map relative to a number of corresponding features found in the binary ground truth map.

12. The computer program product of claim 8, wherein the predetermined value is established in response to a determined accuracy required for safe driving in an area corresponding to the binary ground truth map.

13. The computer program product of claim 8, further comprising program code instructions to:

generate a similarity matrix between the binary ground truth map of pixels and the binary prediction map of pixels, wherein the similarity matrix comprises the features found in the environment of the binary ground truth map and the binary prediction map.

14. The computer program product of claim 8, wherein the precision of the binary prediction map and the recall of the binary prediction map is used by an autonomous vehicle to facilitate navigation of roadways in the environment.

15. A method comprising:
receiving a binary ground truth map of pixels where pixels corresponding to features of an environment are assigned a 1 or a 0, and pixels not corresponding to features of the environment are assigned the other of a 1 or a 0;
receiving a binary prediction map of pixels where pixels corresponding to features of an environment are assigned a 1 or a 0, and pixels not corresponding to features of the environment are assigned the other of a 1 or a 0;
determining at least one feature within the binary ground truth map of pixels based on pixels including the at least one feature, wherein the at least one feature within the binary ground truth map of pixels comprises a feature type;
determining at least one corresponding feature within the binary prediction map of pixels based on pixels including the at least one corresponding feature;
computing the overlap of pixels of the at least one feature from the binary ground truth map with the pixels of the at least one corresponding feature from the binary prediction map;
matching the at least one feature from the binary ground truth map with the at least one corresponding feature from the binary prediction map in response to the overlap of pixels satisfying a predetermined value, wherein the predetermined value is determined based on the feature type;
establishing a precision of the binary prediction map based on the overlap of pixels;
establishing a recall of the binary prediction map based on the overlap of pixels satisfying a predetermined recall value for the at least one feature; and
generating a report including the precision of the binary prediction map related to each of the at least one features and a recall of the binary prediction map related to a number of the at least one features found in the binary ground truth map that were found in the binary prediction map.

16. The method of claim 15,
wherein the at least one feature from the binary ground truth map comprises a first ground truth lane line of a road;
wherein the at least one corresponding feature from the binary prediction map comprises a first prediction lane line of the road; and
wherein the precision of the binary prediction map with respect to the first ground truth lane line comprises a measure of overlap of pixels of the first prediction lane line with the pixels of the first ground truth lane line.

17. The method of claim 16,
wherein the recall of the binary prediction map with respect to the binary ground truth map comprises a measure of a number of features found in the binary prediction map relative to a number of corresponding features found in the binary ground truth map.

18. The method of claim 15, wherein the predetermined value is established in response to a determined accuracy required for safe driving in an area corresponding to the binary ground truth map.

19. The method of claim 15, further comprising:
generating a similarity matrix between the binary ground truth map of pixels and the binary prediction map of pixels, wherein the similarity matrix comprises the features found in the environment of the binary ground truth map and the binary prediction map.

20. The method of claim 15, further comprising using the precision of the binary prediction map and the recall of the binary prediction map by an autonomous vehicle to facilitate navigation of roadways in the environment.

21. The apparatus of claim 1, wherein different feature types correspond to different predetermined values for an overlap between a feature from the binary ground truth map to be matched with a corresponding feature from the binary prediction map.

* * * * *